(12) United States Patent
Fan

(10) Patent No.: US 9,121,513 B1
(45) Date of Patent: Sep. 1, 2015

(54) TRIPLE ECCENTRIC VALVE WITH SYMMETRIC DRAIN-PROOF RING APPLIED NO NORMAL FORCE TO VALVE SEAT

(71) Applicant: Yi-Ming Fan, Taipei (TW)

(72) Inventor: Yi-Ming Fan, Taipei (TW)

( * ) Notice: Subject to any disclaimer, the term of this patent is extended or adjusted under 35 U.S.C. 154(b) by 0 days.

(21) Appl. No.: 14/231,763

(22) Filed: Apr. 1, 2014

(51) Int. Cl.
*F16K 1/226* (2006.01)

(52) U.S. Cl.
CPC .................................. *F16K 1/2263* (2013.01)

(58) Field of Classification Search
CPC .......... F16K 1/22; F16K 1/226; F16K 1/2263
USPC ......................................... 251/305–308, 368
See application file for complete search history.

(56) References Cited

U.S. PATENT DOCUMENTS

| | | | | |
|---|---|---|---|---|
| 3,290,001 | A * | 12/1966 | Taylor | 251/306 |
| 4,254,937 | A * | 3/1981 | Hubertson | 251/305 |
| 4,284,264 | A * | 8/1981 | Hubertson | 251/306 |
| 7,296,585 | B2 * | 11/2007 | Eggleston et al. | 251/306 |

* cited by examiner

*Primary Examiner* — John Bastianelli

(57) ABSTRACT

A triple eccentric valve with a symmetric drain-proof ring includes a valve body, a stem, a valve disk, a waterproof washer, and a drain-proof ring. The valve disk is formed as an asymmetric conical shape. The drain-proof ring is an O ring and is arranged in a stepped recess of the valve disk to seal the waterproof washer; the drain-proof ring is symmetric to the axis of the ring. In assembly state, a periphery of the drain-proof ring resists against an inner wall of the annular seat. The drain-proof ring is symmetrical. Furthermore, an inner side or a part of the valve seat has a shape matched to a sweeping track of an outermost point of the drain-proof ring so that when the drain-proof ring moves along the valve seat, only force tangent to the inner side of the valve seat is applied from the drain-proof ring to the valve seat.

5 Claims, 8 Drawing Sheets

TRIPLE ECCENTRIC VALVE WITH SYMMETRIC DRAIN-PROOF RING APPLIED NO NORMAL FORCE TO VALVE SEAT

The present invention is a Continuation In Part (CIP) of U.S. patent Ser. No. 13/626,893, which is assigned to the applicant of the present invention and has the same inventor of the present invention. Thus, the contents of U.S. patent Ser. No. 13/626,893 is incorporated into the present invention as a part of the present invention.

FIELD OF THE INVENTION

The present invention related to valves, and in particular to a triple eccentric valve with a symmetric drain-proof ring applied no normal force to a valve seat.

BACKGROUND OF THE INVENTION

With reference to FIGS. 8 and 9, a prior art triple eccentric valve structure is illustrated. Such kind of valve has been disclosed in some prior art, such U.S. Pat. No. 4,284,264.

In FIG. 9, the prior art disk valve has a valve body 1' having a chamber 10', a stem 2' passing through the valve body 1' to the chamber 10'; an annular seat 30' installed in the chamber 10'; and an drain-proof ring 32 which is an O ring. The drain-proof ring 32 is asymmetric to an axis passing through a center of the ring (referring to FIG. 8). A valve disk 31' is installed to the valve body 1'. A radial hole radially passes through the valve disk 31' for receiving the stem 2' for controlling the valve disk 31' to open or close.

The drain-proof ring is a triple eccentric structure. That is, referring to FIG. 9, a longitudinal radial line of the valve disk is shifted from a longitudinal radial line of the valve body, this is so-called first shift (A'); an axial center of the valve disk is shifted from the center of the valve body, this is so-called second shift (B'); the valve disk 31' is an asymmetric taper so as to form as a third shift (C'). Since in the prior art, the valve disk 31' is an asymmetric taper (see FIG. 8) and thus the drain-proof ring 32' received in an annular trench of the valve disk 31' is also an asymmetric structure for tightly contracting the annular seat 30' received in the inner annular wall of the valve body 1. As a result, every radial part of the drain-proof ring 32' is critically defined to match the shape of the annular seat 30'. Thus, it is very difficult to manufacture this ring. Furthermore, a slight rotation of the drain-proof ring 32' with respect to the annular seat 30' will induce gaps between the valve body and the valve disk and thus fluid will drain out from one side of the valve to another side.

As illustrated in FIGS. 8 and 9, it is illustrated that in the prior tripe eccentric valve, a lower side of the valve is horizontal and the upper side thereof is inclined. The slopes of sides between the upper and lower sides are between the slope of the horizontal line and the slope of the included line of the upper side. As a result, the edges of the drain-proof ring 32' (see FIG. 8) are asymmetrical with respect to the middle axial line. This induces the difficulties in manufacturing process because it must be precise to form the desired shape. Furthermore, in installing the drain-proof ring, the positioning of the ring must be very accurately to fit the shape of the annular seat around the ring. Furthermore, the structure of the drain-proof ring 32' will resist against the valve seat 30'. For a long time, the valve ring 30' will distort. If dirt material is remained in the connection area between the drain-proof ting 32' and the valve seat 30', the drain-proof ring 32' will push the dirt material to compress the valve seat 30' so as to destroy the sealing effect of the valve.

Therefore, there is an eager demand for a novel design which can improve the above mentioned defects.

SUMMARY OF THE INVENTION

Accordingly, the object of the present invention is to provide a triple eccentric valve with a symmetric drain-proof ring applied no normal force to a valve seat, wherein in the present invention, the drain-proof ring is symmetrical, which still tightly seal flows at two sides of the valve disk, it is easy to install the drain-proof ring to the valve disk without to align the drain-proof ring to a specific angle, but the prior art drain-proof ring must be installed to the valve disk with a specific angle. Since the drain-proof ring of the present invention is symmetric and thus it can be designed by computers and is manufactured by machines, but the prior art asymmetric drain-proof ring is made by manual works. Moreover, in use, when dirt accumulates on the drain-proof ring, it can remove the dirt by directly rotating the drain-proof ring.

Therefore, the object of the present invention is to provide a triple eccentric valve with a symmetric drain-proof ring applied no normal force to a valve seat comprising: a valve body (1) having a chamber (10) therein; a wall of the chamber being formed with an annular trench (313) for receiving an annular seat (30); a radial cross section of the annular seat having a trapezoidal shape; the annular seat (30) being detachable; a stem (2) penetrating through the valve body (1) so as to protrude into the chamber (10); a top end protruding from the valve body (1) having an operation unit for driving the stem (2) to rotate; a valve disk (31) installed in the chamber (10) of the valve body (1) and contacting an inner wall of the annular seat (30); a radial hole (310) being formed radially along the valve disk (31) for receiving the stem (20 so that rotation of the stem will rotate the valve disk for opening or closing the valve; and a rear side of the valve disk (31) being formed with a stepped recess (311); the valve disk (31) is formed as an asymmetric conical shape; a waterproof washer (33) being a ring and being received in the annular trench of the valve disk (1); and a drain-proof ring (32) being an O ring and being arranged in the stepped recess (311) of the valve disk (31) to seal the waterproof washer (33); the drain-proof ring (32) being symmetric to the axis of the ring; in assembly state, a periphery of the drain-proof ring (32) resisting against an inner wall of the annular seat (30) so as to tightly seal the space between the drain-proof ring and the annular seat; and wherein an inner side or a part of the valve seat (30) has a shape matched to a sweeping track of "an outermost point" of the drain-proof ring (32) so that when the drain-proof ring (32) moves along the valve seat (30), only force tangent to the inner side of the valve seat (30) is applied from the drain-proof ring (32) to the valve seat (30); wherein after assembly, a left side of an outer periphery of an assembled structure including the valve disk (31), the waterproof washer (33) and the drain-proof ring (32) has a conical shape; and when the waterproof washer deforms, the drain-proof ring has preferred flexibility, which can compensate the gap due to the deformation.

DETAILED DESCRIPTION OF THE INVENTION

Figure 1A:
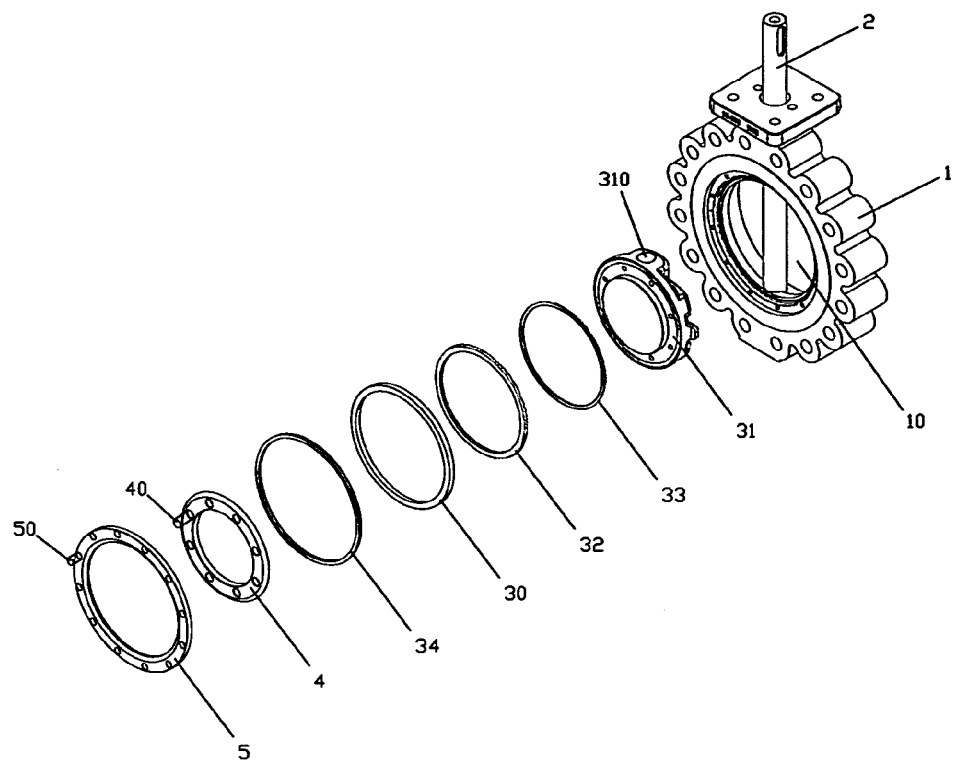
FIG. 1A is an exploded view of the valve of the present invention.
Figure 1B:
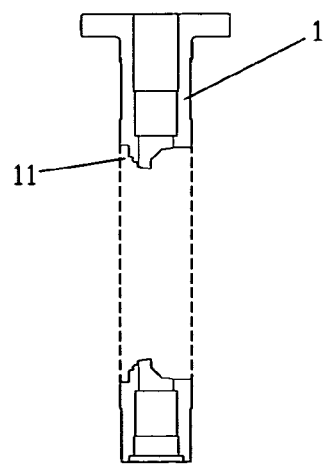
FIG. 1B shows a cross sectional view of the valve body of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

With reference to FIGS. 1A, 1B, 2, 3A, 3B, 4, 5 and 6, the detained structure of the triple eccentric valve according to the present invention is illustrated. The structure of the present invention has the following elements.

A valve body 1 has a chamber 10 therein. A front outer edge of the valve body 1 is formed with a stepped recess 11 (referring to FIG. 1B) for receiving an annular seat 30. A radial cross section of the annular seat 30 has a trapezoidal shape (see FIG. 3A). In the present invention, the annular seat 30 is detachable.

A stem 2 penetrates through the valve body 1 so as to protrude into the chamber 10. A top end of the stem 2 protruding from the valve body 1 has an operation unit (not shown) for driving the stem 2 to rotate.

Figure 1C:
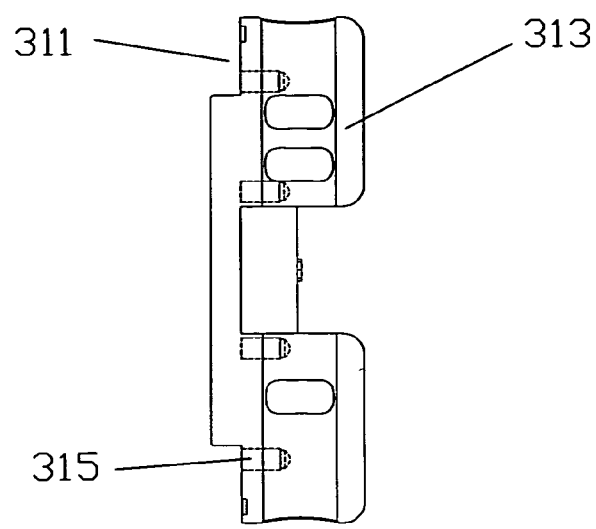
FIG. 1C shows a cross sectional view of the valve disk of the present invention.

A valve disk 31 is installed in the chamber 10 of the valve body 1 and an outer rim area thereof contacts an inner wall of the annular seat 30. A radial hole 310 is formed radially along the valve disk 31 for receiving the stem 2 so that rotation of the stem 2 will rotate the valve disk 31 for opening or closing the valve. Referring to FIG. 1C, a front side of the valve disk 31 is formed with a stepped recess 311. An axial surface 312 in the stepped recess 311 of the valve disk 31 is formed with an annular trench 313. The axial surface 312 of the valve disk 31 is formed with a plurality of grooves 315.

Figure 1D:
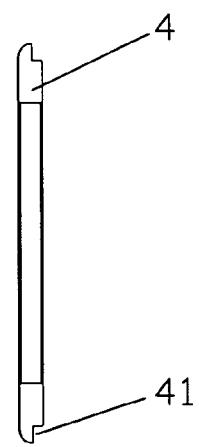
FIG. 1D shows a cross sectional view of the inner annular cover of the present invention.
Figure 2:
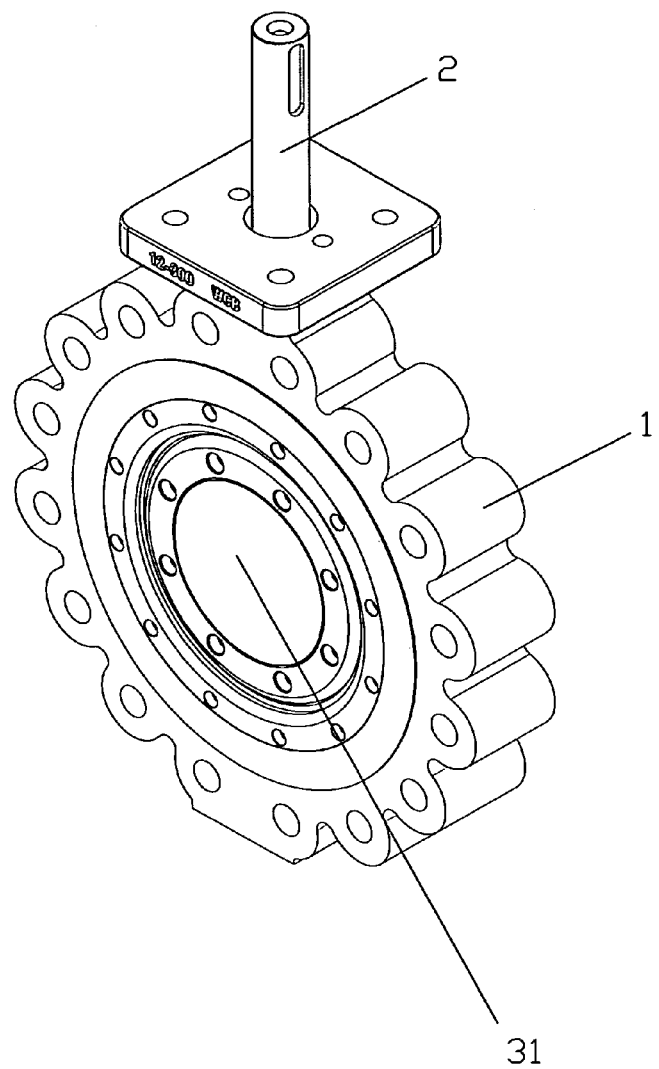
FIG. 2 is an assembled perspective view of the valve body of the present invention.

An inner annual cover 4 is fitted to a front side of the valve disk 31. The annular cover 4 can be fitted into the grooves 315 in the front side of the valve disk 31 by using screws or other similar structure. With reference to FIG. 1D, a rear side of the annular cover 4 has a stepped edge 41 along an edge thereof.

An outer annular cover 5 is fitted into a front side of the valve body 1. The outer annular cover 5 can be fitted into the grooves 12 in the front side of the valve body 1 by using screws or other similar structure to penetrate the groove 50 of the outer annular cover 5.

A drain proof assembly 3 includes the following elements.

A waterproof washer 33 is a ring and is received in the annular trench 313 of the valve disk 31. Preferably, the waterproof washer 33 is made of metal or metal alloy.

A drain-proof ring 32 is an O ring and is arranged in the stepped recess 311 of the valve disk 31 and the step edge 41 of the inner annular cover 4 and also seal the waterproof washer 33 in the annular trench 313. The drain-proof ring 32 is preferably made of silicon gal or graphite or PTEF, etc. In assembly state, referring to FIG. 4, a periphery of the drain-proof ring 32 resists against an inner edge of the annular seat 30 so that the valve effectively seals the two spaces at two sides of the valve disk.

When the waterproof washer 33 deforms, the drain-proof ring 32 has preferred flexibility, which can compensate the gap due to the deformation of the waterproof washer 33.

A sealing ring 34 is assembled in a space between a front lateral side of the valve body 1, a rear lateral side of the outer annular cover 5 and an outer edge of the vale seat 30 for providing a tightly sealing effect to the valve. Preferably, the sealing ring 34 is made of metal.

With reference to FIGS. 2, 3A, 3B and 4, after assembly, a lateral side of an outer periphery of the valve disk assembly (including the valve disk 31, the waterproof washer 33 and the drain-proof ring 32) has a conical shape (see the valve disk 31 between the tangent lines R and R').

In the present invention, the valve disk 31 is formed as a triple eccentric structure. The detail will be described herein with referring to FIGS. 3A and 3B (also can referring to the prior arts described in the above background of the invention). A maximum radial axis P of the valve disk 31 is shifted with a distance A from a radial line P' passing transversal center of the chamber 10 (see FIG. 3).

Furthermore, an axial central line Q of the valve disk 31 is shifted from an axial center line Q' of the chamber 10 of the valve body 1.

Figure 3A:
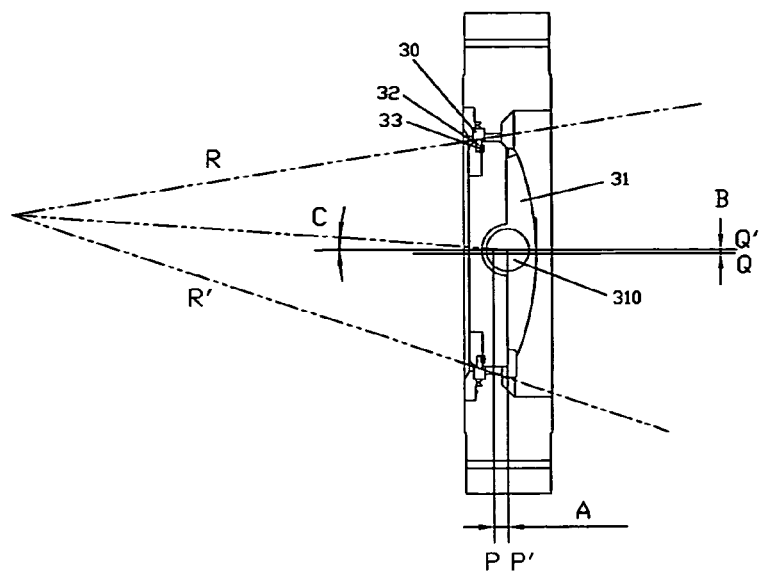
FIG. 3A is a cross sectional view of the present invention with a triple eccentric structure.
Figure 3B:
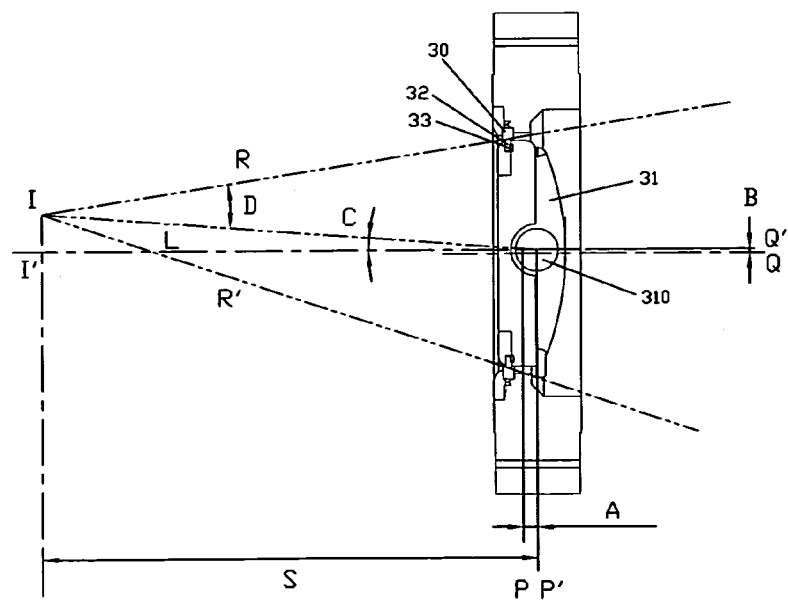
FIG. 3B is another cross sectional view of the present invention with a triple eccentric structure.
Figure 4:
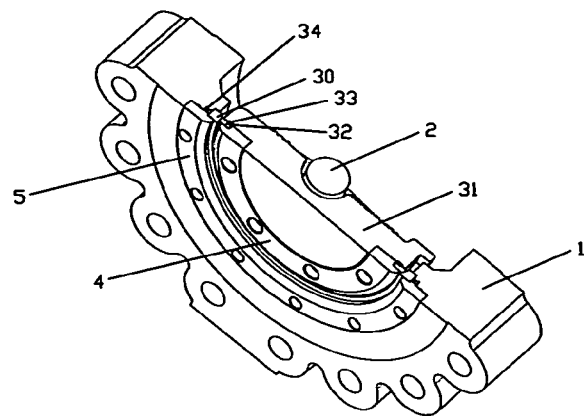
FIG. 4 is a cut view of the valve of the present invention.
Figure 5A:
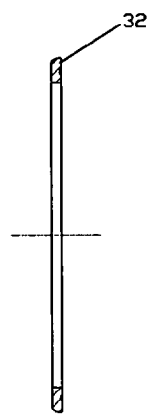
FIGS. 5A and 5B are schematic cross sectional view and perspective view, respectively, showing the drain-proof ring of the present invention.
Figure 5B:
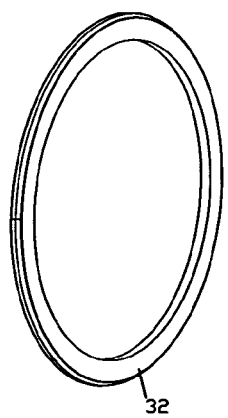
Figure 6A:
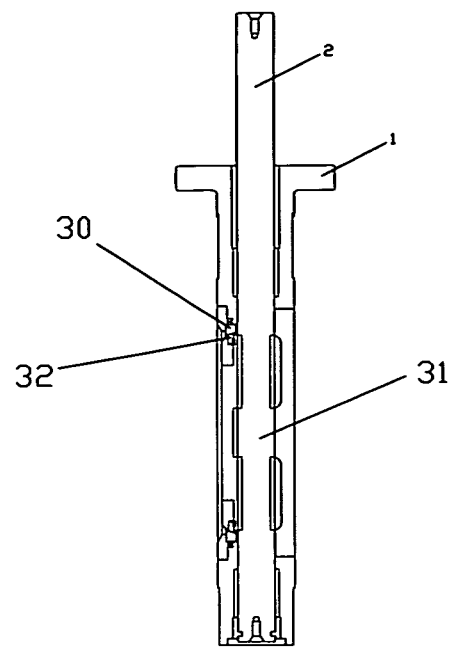
FIGS. 6A and 6B are cross section view and perspective view showing the detail structure about the valve of the present invention.
Figure 6B:
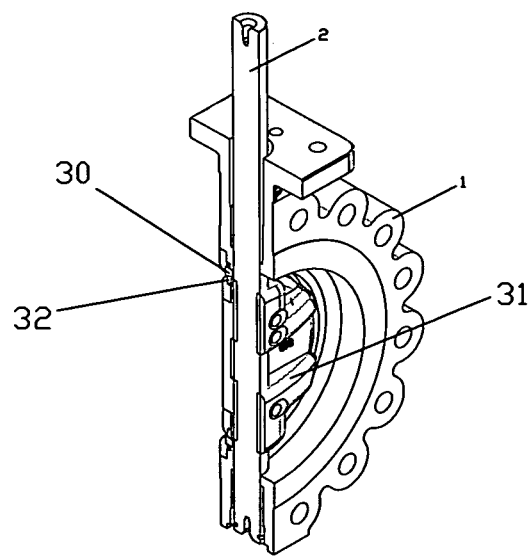

With reference to FIGS. 5A and 5B, it is illustrated, that the conical shape of the valve disk 31 is an asymmetric conical shape according to the present invention. Inclinations (Slopes) of tangent lines along a lateral side of the valve disk 31 are gradually changed from a largest one at an upper side to a smallest one at a lower side. An upper tangent line R tangent to an upper edge of the disk 31 has a largest slope; and a lower tangent line R' tangent to a lower edge of the disk 31 has a smallest slope, but not horizontal. The upper tangent line R is intersected with the lower tangent line R' at a point I, as illustrated in FIGS. 3A and 3B, where the absolute value of the slope (inclination) of the upper tangent line is smaller than that of the lower tangent line. A distance from the intersect point I to the axial central line Q of the chamber 10 is smaller than a radius of the valve disk 31.

A feature of the present invention is that the valve disk 31 is not a symmetrical cone, but slopes of tangent lines (inclination) along lateral sides of the valve disk 31 are gradually changed from a largest one (for R') to a smallest one (for R). However the annular seat 30 installed to the valve body 1 is in contact with the valve disk 31 and thus the slopes of the annular seat 30 must match to the slopes of the valve disk 31. The slopes of tangent lines along a lateral side of the annular seat 30 are gradually changed from a largest one to a smallest one as those of the valve disk 31.

Figure 8:
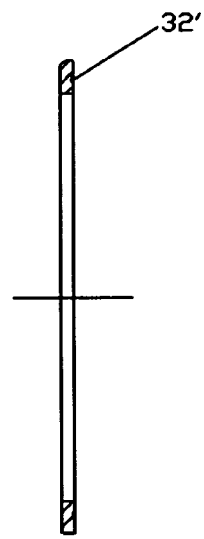
FIG. 8 is a schematic view showing the prior art drain-proof ring.
Figure 9:
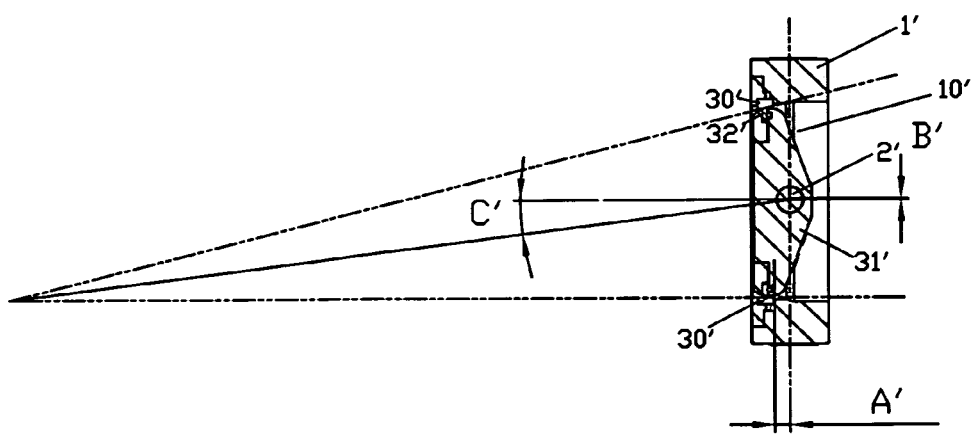
FIG. 9 is a schematic view of a prior art triple eccentric valve.

However although the valve disk 31 is not a symmetrical taper shape, but in the present invention, the drain-proof ring 32 is a symmetrical ring (see FIGS. 5A and 5B) which still completely seal flows in two sides of the disk 30. In the prior art, the drain-proof ring 32' (see FIG. 8) must be unsymmetrical so as to completely seal flows in two sides of the valve disk 30, but this kind of ring is very difficult in manufacture since each radial part of the ring is critical defined for tightly sealing flows at two sides of the disk 30 so that in manufacturing, it needs to form these critical defined angles. It is difficult.

Referring to FIGS. 3A, 3B, 6A and 6B, in the present invention, in assembly, the annular seat 30 is installed to the valve body 1. The annular seat 30 is installed between the outer annular cover 5 and the lateral side of the valve body 1. The sealing ring 34 is assembled in a space between the front lateral side of the valve body 1, the rear lateral side of the outer annular cover 5 and the outer edge of the vale seat 30. Then the waterproof washer 33 is installed to the annular trench 313 of the valve disk 31. The drain-proof ring 32 (referring to FIGS. 5A and 5B) is arranged in the stepped recess 311 of the valve disk 31 to seal the waterproof washer 33. The inner annual cover 4 is fitted to the stepped recess 311 and the outer annular cover 5 is fitted into a front side of the valve body 1. Then the valve disk 31 is placed to the chamber' 10 of the valve body 1. The stem 2 penetrates through the valve body 1 so as to protrude into the chamber 10.

The top end thereof protrudes from the valve body 1 has an operation unit (not shown) for driving the stem 2 to rotate. Then the stem 2 passes through the radial hole 310 so that rotation of the stem 2 will rotate the valve disk 31. The drain-proof unit 3 is installed between the valve disk 31 and the valve body 1.

Figure 7C:
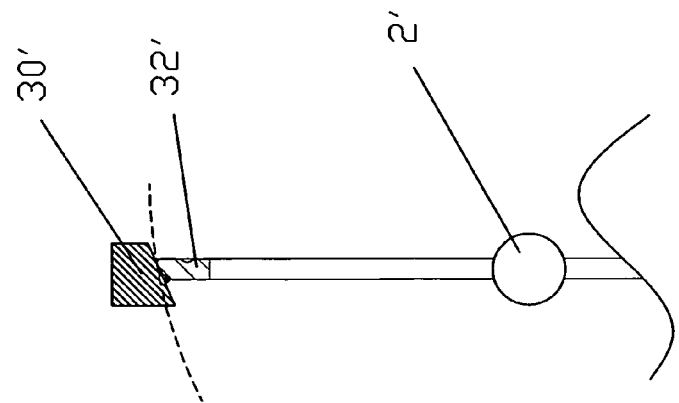
FIG. 7C is a cross sectional view for explaining the operation of a prior art triple eccentric valve.
Figure 7B:
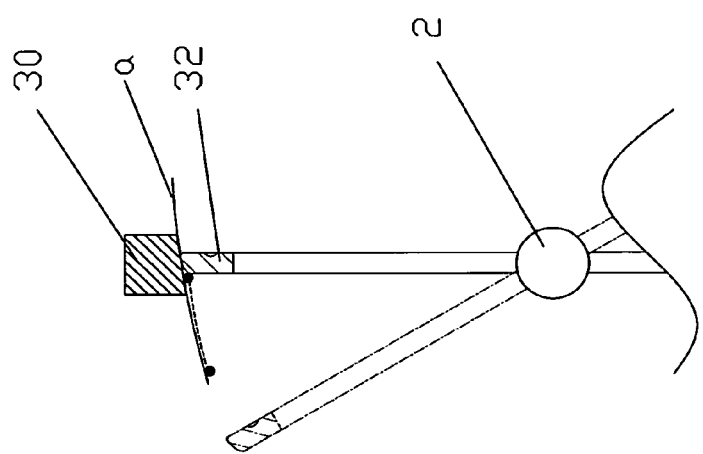
FIG. 7B is a cross sectional view for explaining the operation of the structure shown in FIG. 7A.
Figure 7A:
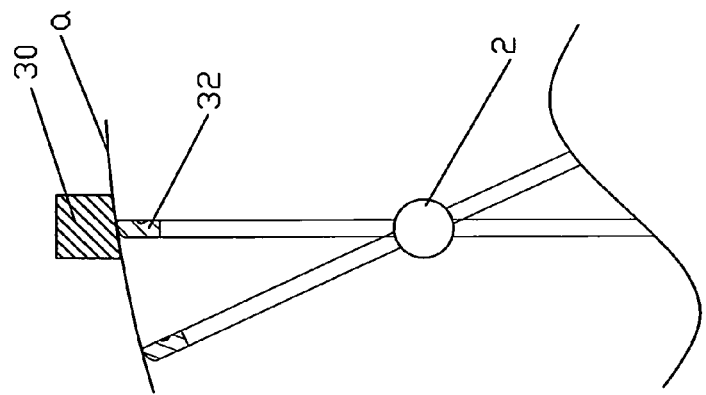
FIG. 7A is a cross sectional view showing the structure about the valve seat of the present invention.

Referring to FIGS. 7A, 7B and 7C, it is illustrated that an inner side or a part of the valve seat 30 has a shape matched to a sweeping track "a" of "a outermost point" of the drain-proof ring 32 as illustrated in FIG. 7A. With reference to FIG. 7B, the advantage of this design is that only friction force is formed as the drain-proof ring 32 moving along the inner surface of the valve seat 30 without normal force being applied from the drain-proof ring to the valve seat. Therefore, if dirt (or undesired particles are accumulated at a moving path of the drain-proof ring 32 along the inner side of the valve seat 30, since no normal force vertical to the inner surface of the valve seat 30 applied from the drain-proof ring 32 to the valve seat 30, and only the friction force tangent to the inner surface of the drain-proof ring 32 is applied. However, this force will push the dirt object moves along the inner surface of the valve seat 30. Finally, the dirt object will remove from the valve without hindering the movement of the vale disk 31.

However, as illustrated in FIG. 7C, in the prior art structure, the drain-proof ring 32' is an asymmetric structure and the inner surface of the valve seat 30' is not made along the track of the outermost point of the drain-proof ring 32'. As a result, the dirt object accumulated in the inner surface of the valve seat 30' will compress b y the drain-proof ring 32' due to the normal force applied from the valve disk 32' to the valve seat 30'. For a long time, more and more dirt objects are accumulated along the moving parth of the valve disk 31' so as to effect the operation of the valve.

In the present invention, the drain-proof ring 32 is symmetrical to a center thereof, it still tightly seal flows at two sides of the valve disk 30, it is easy to install the drain-proof ring 32 to the valve disk 31 without to align the drain-proof ring 32 to a specific angle, but the prior art drain-proof ring 32' must be installed to the valve disk with a specific angle. This is because in the design of the present invention, the drain-proof ring 32 can still tightly contact the annular seat 30 without gaps therebetween to isolate flows at two sides of the valves. However the prior art drain-proof ring 32' in FIG. 7 is not symmetric and thus in installing, it must be aligned precisely.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A triple eccentric valve with a symmetric drain-proof ring comprising:
   a valve body (1) having a chamber (10) therein; a wall of the chamber being formed with a stepped recess (11) for receiving an annular seat (30); a radial cross section of the annular seat having a trapezoidal shape; the annular seat (30) being detachable;
   a stem (2) penetrating through the valve body (1) so as to protrude into the chamber (10); a top end protruding from the valve body (1) having an operation unit for driving the stem (2) to rotate;
   a valve disk (31) installed in the chamber (10) of the valve body (1) and contacting an inner wall of the annular seat (30); a radial hole (310) being formed radially along the valve disk (31) for receiving the stem (20) so that rotation of the stem will rotate the valve disk for opening or closing the valve; and a rear side of the valve disk (31) being formed with a stepped recess (311) and an axial surface (312) in the stepped recess (311) of the valve disk (31) being formed with an annular trench (313); the valve disk (31) is formed as an asymmetric conical shape;
   a waterproof washer (33) being a ring and being received in the annular trench (313) of the valve disk (31); and
   a drain-proof ring (32) being an O ring and being arranged in the stepped recess (311) of the valve disk (31) to seal the waterproof washer (33); the drain-proof ring (32) being symmetric to the axis of the waterproof washer (33); in assembly state, a periphery of the drain-proof ring (32) resisting against an inner wall of the annular seat (30) so as to tightly seal a space between the drain-proof ring and the annular seat; and
   wherein an inner side or a part of the valve seat (30) has a shape matched to a sweeping track of the drain-proof ring (32) so that when the drain-proof ring (32) moves along the valve seat (30), only friction force tangent to the inner surface of the valve seat (30) is applied from the drain-proof ring (32) to the valve seat (30);
   wherein after assembly, a left side of an outer periphery of an assembled structure including the valve disk (31), the waterproof washer (33) and the drain-proof ring (32) has a conical shape; and
   when the waterproof washer deforms, the drain-proof ring has flexibility, which can compensate a gap due to the deformation.

2. The triple eccentric valve with a symmetric drain-proof ring as claimed in claim 1, wherein
   a front side of the valve disk (31) is formed as a cone; the axial surface of the valve disk (31) is formed with a plurality of grooves (315);
   an annual cover (4) is fitted to the stepped recess (311); a lateral side of the annular cover is formed with a plurality of protrusions (40); the plurality of grooves (315) in the axial surface of the valve disk serves to receive the protrusions of the annular cover; and an outer annular cover (5) is fitted into a front side of the valve body (1); the outer annular cover (5) can be fitted into the grooves (12) in the front side of the valve body (1).

3. The triple eccentric valve with a symmetric drain-proof ring as claimed in claim 1, wherein the conical shape of the valve disk (31) is an asymmetric conical shape; slopes of tangent lines along a lateral side of the valve disk are gradually changed from a largest one to a smallest one; an upper tangent line (R) tangent to an upper edge of the disk (31) has a largest slope; and a lower tangent line (R') tangent to a lower edge of the disk (31) has a smallest slope, but not horizontal; the upper tangent line (R) is intersected with the lower tangent line (R') at a point (I), where the absolute value of the slope of the upper tangent line (R) is smaller than that of the lower tangent line (R'); a distance from the intersect point (I) to an axial central line (Q') of the chamber (10) is smaller than a radius of the valve disk (31).

4. The triple eccentric valve with a symmetric drain-proof ring as claimed in claim 3, wherein a maximum radial axis (P) of the valve disk (31) is shifted with a distance (A) from a radial line (P') passing transversal center of the chamber (10); and an axial central line (Q) of the valve disk (31) is shifted from an axial center line (Q') of the chamber of the valve body.

5. The triple eccentric valve with a symmetric drain-proof ring as claimed in claim 1, wherein a sealing ring (34) is assembled in a space between a front lateral side of the valve body (1), a rear lateral side of the outer annular cover (5) and an outer edge of the vale seat (30) for providing a tightly sealing effect to the valve.

* * * * *